United States Patent
Gahleitner et al.

(10) Patent No.: US 12,209,148 B2
(45) Date of Patent: Jan. 28, 2025

(54) NUCLEATED PROPYLENE POLYMER COMPOSITION WITH HIGH TOUGHNESS

(71) Applicant: BOREALIS AG, Vienna (AT)

(72) Inventors: Markus Gahleitner, Linz (AT); Jingbo Wang, Linz (AT); Dietrich Gloger, Linz (AT); Klaus Bernreitner, Linz (AT)

(73) Assignee: BOREALIS AG, Vienna (AT)

( * ) Notice: Subject to any disclaimer, the term of this patent is extended or adjusted under 35 U.S.C. 154(b) by 776 days.

(21) Appl. No.: 17/429,230

(22) PCT Filed: Jan. 20, 2020

(86) PCT No.: PCT/EP2020/051239
§ 371 (c)(1),
(2) Date: Aug. 6, 2021

(87) PCT Pub. No.: WO2020/160892
PCT Pub. Date: Aug. 13, 2020

(65) Prior Publication Data
US 2022/0135714 A1 May 5, 2022

(30) Foreign Application Priority Data
Feb. 8, 2019 (EP) .................................. 19156140

(51) Int. Cl.
*C08F 110/06* (2006.01)
*B29B 9/06* (2006.01)
(Continued)

(52) U.S. Cl.
CPC ............ *C08F 110/06* (2013.01); *B29B 9/065* (2013.01); *C08F 4/65927* (2013.01);
(Continued)

(58) Field of Classification Search
CPC ............................... C08F 110/06; C08L 23/12
See application file for complete search history.

(56) References Cited

U.S. PATENT DOCUMENTS

2017/0240733 A1    8/2017  Gitsas et al.

FOREIGN PATENT DOCUMENTS

| EP | 2657285 A1 | 10/2013 |
| WO | 2018069263 A1 | 4/2018 |
| WO | 2020160892 A1 | 8/2020 |

OTHER PUBLICATIONS

International Preliminary Report on Patentability for related International Patent Application No. PCT/EP2020/051239, dated Aug. 10, 2021, 7 pages.

(Continued)

*Primary Examiner* — Catherine S Branch
(74) *Attorney, Agent, or Firm* — DITTHAVONG, STEINER & MLOTKOWSKI (57) ABSTRACT

The present invention is directed to a propylene polymer composition comprising (a) at least 90 wt. %, based on the weight of the total propylene homopolymer composition, of a propylene homopolymer having (i) a pentad isotacticity (mmmm) of equal or more than 98.0 mol.-%, determined by quantitative $^{13}C$ NMR spectroscopy, (ii) a relative amount of <2,1> erythro regio-defects of not more than 0.2 mol.-%, determined by quantitative $^{13}C$ NMR spectroscopy, as described herein, and (b) a nucleating agent (B) selective for the beta-modification of isotactic polypropylene in an amount of from 0.001 to 1.0 wt. %, based on the weight of the total propylene homopolymer composition, wherein said propylene homopolymer composition has a melt flow rate $MFR_2$ (230° C., 2.16 kg) according to ISO 1133 of 0.1 to 10 g/10 min., a beta-phase content of not less than 80%, measured by wide angle x-ray scattering (WAXS). Further disclosed is a moulded propylene homopolymer product (Continued)

obtainable by compression moulding or extrusion of the propylene homopolymer composition.

15 Claims, 2 Drawing Sheets

(51) Int. Cl.
*C08F 4/6592* (2006.01)
*C08K 5/00* (2006.01)
*C08K 5/098* (2006.01)
*C08K 5/3465* (2006.01)
*C08L 23/12* (2006.01)

(52) U.S. Cl.
CPC ............ *C08K 5/0083* (2013.01); *C08K 5/098* (2013.01); *C08K 5/3465* (2013.01); *C08L 23/12* (2013.01); *C08L 2203/18* (2013.01); *C08L 2205/025* (2013.01); *C08L 2207/10* (2013.01)

(56) References Cited

OTHER PUBLICATIONS

International Search Report and Written Opinion of the International Searching Authority for related International Patent Application No. PCT/EP2020/051239, dated Aug. 13, 2020, 10 pages.

NUCLEATED PROPYLENE POLYMER COMPOSITION WITH HIGH TOUGHNESS

The present invention is directed to a new nucleated propylene homopolymer composition with improved mechanical, in particular, impact properties as well as to a moulded product comprising the propylene homopolymer.

Only a limited number of documents deal with the influence of chain structure effects on β-nucleation expression. Thus, K. Busse et al., Macromolecules 2000, 33, 8775-8780 describe the formation of β-phase in isotactic polypropylene (iPP) prepared by a metallocene catalyst (defect concentration as determined by $^{13}$C-NMR: 1.1%) upon addition of the nucleating agent N,N-dicyclohexyl-2,6-naphthalene dicarboxamide (0.3 wt %). In the absence of the nucleating agent no β-phase was observed, while the composition showed some β-phase content with nucleation. A content in the range of 30-40% β-phase can be estimated from the wide angle X-ray scattering (WAXS) diagrams in FIG. 2 of said paper, which is clearly below the requirement for efficient impact improvement.

M. Varma-Nair et al, J. Therm. Anal. Calorim. 2004, 59, 483-495 disclose nucleation effects with an α- and a β-nucleating agent for a Ziegler-Natta-based and a metallocene-based propylene homopolymer of undefined chain structure. A significant β-phase content of about 83% for both polymers is only achieved after very slow cooling, i.e. not under realistic processing conditions.

R. Krache et al., Macromolecules 2007, 40, 6871-6878, found that the addition of a 1% by weight of a typical β-nucleating agent is not enough to develop any appreciable amount of β-modification in a metallocene-based propylene homopolymer of undefined chain structure, at least under the crystallization conditions used, which cover a wide range of cooling rates. In comparison, the same amount of β-nucleating agent added to a Ziegler-Natta iPP homopolymer leads to almost 100% of β-form at low cooling rates.

Generating the β-form of polypropylene is an efficient and universal way for improving impact strength of propylene homopolymers and ethylene-propylene random copolymers. For obtaining a sufficiently high content of the β-form it is not only necessary to add a special β-nucleating agent, but also to have a suitable base polymer. It is generally known that the defects on the chain, meaning both stereo- and regio-errors in case of propylene homopolymers, also disturb the formation of the β-form. These can massively disturb formation of the β-modification, as discussed e.g. in EP 2 657 285 A1 and in EP 2 657 286 A1. These disclosures however relate to a limited β-phase content without the addition of a specific nucleating agent. Moreover, the formation of other polypropylene modifications such as a substantial amount of the γ-phase is detrimental for the improvement of impact strength.

Thus, the object of the present invention is to provide a propylene homopolymer composition with improved mechanical, in particular high impact properties combined with high stereoregularity and a limited amount of regio-defects. Such a propylene homopolymer composition should be produced with a process requiring no or only small process adaptations.

These objects can be achieved by the finding of the propylene polymer composition according to the present invention which has a relatively high β-phase content and a relatively low amount of stereo- and regio-defects.

Accordingly, the present invention is directed to a propylene polymer composition comprising:

(a) at least 90 wt. %, based on the weight of the total propylene homopolymer composition, of a propylene homopolymer having
  (i) a pentad isotacticity (mmmm) of equal or more than 98.0 mol.-%, determined by quantitative 13C NMR spectroscopy, as described herein,
  (ii) a relative amount of <2,1> erythro regio-defects of not more than 2.0 mol.-%, determined by quantitative 13C NMR spectroscopy, as described herein, and
(b) a nucleating agent (B) selective for the beta-modification of isotactic polypropylene in an amount of from 0.001 to 1.0 wt. %, based on the weight of the total propylene homopolymer composition,
wherein said propylene homopolymer composition has a melt flow rate MFR2 (230° C., 2.16 kg) according to ISO 1133 of 0.1 to 10 g/10 min., a beta-phase content of not less than 80%, measured by wide angle X-ray scattering (WAXS) as described in the method section below.

The present invention is further directed to a process for the preparation of the above propylene homopolymer composition, comprising the steps of:
  (i) polymerizing propylene in the presence of a single-site polymerization catalyst into a propylene homopolymer (A) as defined in claim 1,
  (ii) melt mixing a suitable amount of the nucleating agent (B) selective for the beta-modification of isotactic polypropylene with said propylene homopolymer (A) in a melt mixing device, and
  (iii) solidifying the resulting melt in a strand or underwater pelletization process.

Even further, the present invention is directed to a moulded propylene homopolymer product obtainable by compression moulding or extrusion of the above propylene homopolymer composition. Such a moulded product may preferably be a part of a fluid transportation system, filtration system or fluid storage system.

Preferably, the above propylene homopolymer composition has a relative Charpy notched impact strength improvement ΔNIS (DeltaNIS) (23° C.) of not less than 4.0, wherein ΔNIS (23° C.) is defined by:

$$\Delta NIS = (NIS_{nuc} - NIS_{PP})/NIS_{PP}$$

where $NIS_{nuc}$ is the Charpy notched impact strength at 23° C. of the β-nucleated propylene homopolymer composition and $NIS_{PP}$ is the Charpy notched impact strength at 23° C. of the non-nucleated propylene homopolymer (a), the Charpy notched impact strength at 23° C. being measured according to ISO 179 1eA.

More preferably the propylene homopolymer composition according to the present invention has a relative Charpy notched impact strength improvement ΔNIS (23° C.) of not less than 4.2, even more preferably of not less than 4.5. An upper limit for ΔNIS (23° C.) is preferably 20.0.

The respective compositions are further characterized by a low content of solubles fraction, particularly of solubles in cold xylene (XCS), as described below.

The propylene homopolymer composition according to the present invention may preferably have an absolute Charpy notched impact strength at 23° C. measured according to ISO 179 1eA, of not less than 30 kJ/m$^2$, more preferably of not less than 35 kJ/m$^2$, even more preferably of not less than 40 kJ/m$^2$. An upper limit for said absolute Charpy notched impact strength at 23° C. is preferably 100 kJ/m$^2$.

The propylene homopolymer composition according to the present invention preferably has a flexural modulus determined according to ISO 178 in the range of 1200 to 2000 MPa, more preferably 1300 to 1900 MPa.

The propylene homopolymer composition according to the present invention preferably has a main melting temperature ($T_m$) of at least 140° C., more preferably in the range of 140 to 152° C., even more preferably in the range of 141 to 150° C. and/or a crystallization temperature ($T_c$) of at least 114° C., more preferably in the range of 115 to 135° C., even more preferably in the range of 116 to 127° C., $T_m$ and $T_c$ being measured by differential scanning calorimetry (DSC). The main melting temperature ($T_m$) is a typical measure to determine a propylene polymer composition representing the β-phase.

The propylene homopolymer composition according to the present invention preferably has a beta-phase content of not less than 85%, more preferably of not less than 88%, even more preferably of not less than 90%, determined by wide-angle X-ray scattering (WAXS) as described in the method section below. An upper limit for said beta-phase content is preferably 99.99%.

The propylene homopolymer composition according to the present invention preferably has a relative content of the gamma-modification (gamma-phase content) of less than 5.0%, more preferably of less than 4.0%, even more preferably of less than 3.0%, determined by wide-angle X-ray scattering (WAXS) as described in the method section below. A lower limit for said gamma-phase content is preferably 0.001%.

PROPYLENE HOMOPOLYMER (A)

The propylene homopolymer composition according to the invention comprises at least 90 wt % of a propylene homopolymer (A) as described above. In further embodiments of the invention, the propylene homopolymer composition comprises at least 95 wt %, at least 97 wt % or at least 99 wt % of a propylene homopolymer (A) as described herein. In a further embodiment of the invention, the propylene homopolymer composition comprises 100 wt %, not more than 99.9 wt %, not more than 99.7 wt %, not more than 99.5 wt % or not more than 99.2 wt % of a propylene homopolymer (A) as described herein. It is to be understood that each combination of lower and upper limits as given above is regarded as disclosed, for example that the propylene homopolymer composition according to the invention comprises a propylene homopolymer (A) as described herein in the range of 90 wt % to 100 wt %, or for example in the range of 90 wt % to 99.7 wt %. In one embodiment the propylene homopolymer (A) is the only polymer within the propylene homopolymer composition of the invention. In still another preferred embodiment the propylene homopolymer composition consists of the polypropylene homopolymer (A) as described herein.

There exists a crucial difference in the chain-microstructure between polypropylenes produced by a metallocene catalyst and a Ziegler-Natta catalyst. The chain regularity of metallocene-based polypropylene is reduced by stereo- and regio-defects, whereas the chain regularity of Ziegler-Natta based polypropylenes is only reduced by stereo-defects. It is important to note that the present propylene homopolymer (A) is obtainable or is obtained in the presence of a single site polymerization catalyst, preferably a supported metallocene-type catalyst yielding a propylene homopolymer, preferably an isotactic propylene homopolymer with high stereoregularity and low amounts of region-defects.

The expression "homopolymer" used in the present invention relates to a polypropylene that consists substantially, i.e. of at least 99.5 wt.-%, more preferably of at least 99.8 wt.-%, of propylene units. In a preferred embodiment only propylene units in the propylene homopolymer are detectable. The comonomer content can be determined with $^{13}$C NMR spectroscopy.

As apparent from the word "propylene homopolymer" the present invention does not define a composition of different polymers. Accordingly the propylene homopolymer may comprise further additives but no other polymer components than the homopolymer.

Further the propylene homopolymer (A) can be defined by the main melting temperature ($T_m$). Thus it is appreciated that the propylene homopolymer (A) preferably has a main melting temperature ($T_m$) measured by differential scanning calorimetry (DSC) of at least 145° C., more preferably of at least 148° C., most preferably of at least 150° C. The upper limit of the main melting temperature ($T_m$) may be given as 170° C., 165° C. or 162° C. Thus it is in particular appreciated that the main melting temperature ($T_m$) measured by differential scanning calorimetry (DSC) of the propylene homopolymer is in the range of 145 to 170° C., more preferably in the range of 148 to 165° C., yet more preferably in the range of 150 to 162° C.

The propylene homopolymer (A) can be defined by its stereoregularity, i.e. by its pentad isotacticity. Thus it is preferred that the propylene homopolymer (A) has a rather high pentad isotacticity (mmmm), i.e. equal or more than 98.0 mol.-%, more preferably equal or more than 98.5 mol.-%, still more preferably equal or more than 99.0 mol.-%, yet more preferably in the range of equal or more than 98.5 to below 100.0 mol.-%, like equal or more than 98.9 to equal or below 99.8 mol.-%. The pentad isotacticity (mmmm) may be determined by quantitative $^{13}$C NMR spectroscopy, as described in the method section below.

The propylene homopolymer (A), e.g. a metallocene-based isotactic propylene homopolymer, contains a detectable amount of regio-defects, i.e. <2,1> erythro regio-defects. Accordingly the isotactic propylene homopolymer, like the metallocene-based isotactic propylene homopolymer, has preferably <2,1> erythro regio-defects of equal or more than 0.0 to equal or below 2.0 mol.-%, preferably in the range of 0.1 to 1.5 mol.-%, more preferably in the range of 0.2 to 1.2 mol.-%. Preferably the propylene homopolymer (A), e.g. the metallocene-based isotactic propylene homopolymer is characterized by a rather low concentration of regio-errors, like <2,1> erythro regio-defects, compared to known metallocene based polypropylenes. Accordingly it is preferred that the propylene homopolymer (A) used in the present invention, has <2,1> erythro regio-defects of preferably equal or more than 0.0 to equal or below 1.8 mol.-%, more preferably of equal or more than 0.05 to equal or below 1.4 mol.-%, e.g. of equal or more than 0.1 to equal or below 1.1 mol.-%. It is to be understood that each combination of lower and upper limits as given above is regarded as disclosed. The <2,1> erythro regio-defects may be determined by quantitative $^{13}C$ NMR spectroscopy, as described in the method section below.

Furthermore, it is preferred that the propylene homopolymer (A) used in the present invention has a melt flow rate (MFR) given in a specific range. Accordingly, it is preferred that in the present invention the propylene homopolymer has an $MFR_2$ (230° C.) of not more than 10.0 g/10 min, more preferably of equal or below 7.0 g/10 min, still more preferably equal or below 5.0 g/10 min. As a lower limit, an $MFR_2$ (230° C.) value of 0.1 g/10 min, preferably equal or above 0.15 g/10 min, still more preferably equal or above 0.2 g/10 min can be given. It is to be understood that every combination of upper with the lower limits is regarded herewith as disclosed.

Furthermore, it is preferred that the propylene homopolymer (A) used in the present invention has a weight average molecular weight Mw of more than 300 kg/mol, more preferably at least 320 kg/mol, like at least 330 kg/mol. It is further preferred that the weight average molecular weight Mw is not more than 1200 kg/mol, more preferably not more than 1000 kg/mol, like not more than 900 kg/mol. The propylene homopolymer (A) preferably has a ratio between weight and number average molecular weight, Mw/Mn, of not more than 4.0, more preferably of not more than 3.5, both Mw and Mn being determined by size exclusion chromatography (SEC), as described in the method section below. A lower limit for the ratio between weight and number average molecular weight, Mw/Mn, is preferably 2.0.

It is also preferred that the propylene homopolymer (A) used in the present invention has a low content of xylene cold solubles (XCS) fraction. Said XCS fraction is preferably less than 1.5 wt %, more preferably less than 1.0 wt %, like less than 0.7 wt %. The XCS fraction is determined as described in the method section below. A lower limit for said content of xylene cold solubles (XCS) is preferably 0.01%.

Beta-Nucleating Agent (B)

The propylene polymer composition of the present invention comprises a nucleating agent (B) selective for the beta-modification of polypropylene, preferably isotactic polypropylene in an amount of from 0.001 to 1.0 wt. %, based on the weight of the total propylene homopolymer composition. Beta-polypropylene can be formed by the addition of beta-nucleating agents to the propylene melt and subsequent crystallization. The beta-crystallinity is preferably induced by a nucleating agent (B) selective for the beta-modification of polypropylene, selected from quinacridone type compounds and dicarboxylic acid salts of metals from group IIa of the periodic system.

The nucleating agent (B) selective for the beta-modification of polypropylene used in the present invention may preferably selected from at least one quinacridone compound specified below:

wherein R1, R2, R3, R4, R5, R6, R7, R8, R9 and R10 independently are H, alky, halogen, alkoxy or aryl;
or at least one dicarboxylic acid salt of at least one earth alkali metal or a mixture thereof.

Preferably R1, R2, R3, R4, R5, R6, R7, R8, R9 and R10 independently are H, $CH_3$, Cl, methoxy or phenyl.

Preferred quinacridone compounds of formula I are quinacridone, dimethylquinacridone and dimethoxyquinacridone. Preferred quinacridone compounds of formula II are quinacridonequinone, a mixed crystal of 5,12-dihydro-quino (2,3b)acridine-7,14-dione with quino(2,3b)acridine-6,7,13,14-(5H, 12H)-tetrone as disclosed in EP-B0177961 and dimethoxyquinacridonequinone. Preferred quinacridone compounds of formula III are dihydroquinacridone, dimethoxydihydroquinacridone and dibenzodihydroquinacridone.

Alternatively, the nucleating agent (B) selective for the beta-modification of polypropylene used in the present invention may preferably selected from at least one dicarboxylic acid salt of metals from group IIa of the periodic system. The dicarboxylic acid salts of earth alkali metals are particularly preferred. Even more preferably pimelic acid calcium salt and suberic acid calcium salt and mixtures thereof are used.

Mixtures of such nucleating agents may also be employed.

Most preferably, the beta-nucleating agent (B) selective for the beta-modification of polypropylene used in the present invention is Cinquasia Gold or pimelic acid calcium salt, particularly preferred Cinquasia Gold.

Further suitable types of beta-nucleating agents are:
dicarboxylic acid derivate type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids,
diamine derivate type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines,
amino acid derivate type diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines,
salts of earth alkali metals and imido acids of the formula IV wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, preferably calcium salts of phthaloylglycine, hexahydrophthaloylglycine, N-phthaloylalanine and/or N-4-methylphthaloylglycine.

Beta-nucleated polypropylene with an amount of beta-crystallinity of at least 85% can be obtained for example by using a beta-nucleating agent in an amount of 0.005 to 0.2 wt.-% with respect to the polypropylene composition.

The beta-nucleating agent can be provided in a master batch. The master batch preferably consists of the beta-nucleating agent, a polypropylene resin and/or a polyolefin wax.

Catalyst System

The propylene homopolymer composition may preferably be produced in the presence of a supported metallocene catalyst, more preferably in the presence of a catalyst system comprising (i) a complex of formula (I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

each $R^1$ is independently a $C_1$-$C_{20}$ hydrocarbyl radical optionally containing one or more heteroatoms from groups 14-16 of the periodic table of elements, or is a $C_4$-$C_{20}$ hydrocarbyl radical branched at the β-atom to the cyclopentadienyl ring, optionally containing one or more heteroatoms belonging to groups 14-16 of the periodic table of elements, or is a $C_3$-$C_{20}$ hydrocarbyl radical branched at the β-atom to the cyclopentadienyl ring where the β-atom is an Si-atom;

each $R^a$ is independently hydrogen or an aliphatic $C_1$-$C_{20}$ hydrocarbyl group optionally containing one or more heteroatoms from groups 14-16 of the periodic table of elements;

each $R^b$ is independently hydrogen or an aliphatic $C_1$-$C_{20}$ hydrocarbyl group optionally containing one or more heteroatoms from groups 14-16 of the periodic table of elements; or an $R^a$ and $R^b$ group on adjacent carbon atoms can be taken together to form a 5 membered saturated carbon ring which is optionally substituted by n groups $R^2$, n being from 0 to 3;

each $R^2$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

each $R^4$ is independently an aliphatic $C_{1-20}$ hydrocarbyl group optionally containing one or more heteroatoms from groups 14-16 or is a hydrogen atom;

each W group is independently an aryl or heteroaryl group having up to 20 carbon atoms optionally substituted by one or more groups $R^3$;

each $R^3$ is the same or different and is a $C_1$-$C_{20}$ hydrocarbyl group optionally containing one or more heteroatoms belonging to groups 14-16 of the periodic Table; or two $R^3$ groups on adjacent carbon atoms taken together can form a fused 5- or 6-membered non-aromatic ring with the W group, said ring being itself optionally substituted with one or more $C_1$-$C_{20}$ hydrocarbyl group(s), or two adjacent $R^3$ groups taken together can form a further mono- or multicyclic ring condensed to W optionally substituted by one or two groups $R^3$;

and (ii) optionally a co-catalyst comprising a compound of a metal of group 13 of the periodic table of elements.

The term $C_1$-$C_{20}$ hydrocarbyl group therefore includes $C_1$-$C_{20}$ alkyl, $C_2$-$C_{20}$ alkenyl, $C_2$-$C_{20}$ alkynyl, $C_3$-$C_{20}$ cycloalkyl, $C_3$-$C_{20}$ cycloalkenyl, $C_6$-$C_{20}$ aryl groups, $C_7$-$C_{20}$ alkylaryl groups or $C_7$-$C_{20}$ arylalkyl groups or of course mixtures of these groups such as cycloalkyl substituted by alkyl.

Unless otherwise stated, preferred $C_1$-$C_{20}$ hydrocarbyl groups are $C_1$-$C_{20}$ alkyl, $C_4$-$C_{20}$ cycloalkyl, $C_5$-$C_{20}$ cycloalkyl-alkyl groups, $C_7$-$C_{20}$ alkylaryl groups, $C_7$-$C_{20}$ arylalkyl groups or $C_6$-$C_{20}$ aryl groups, especially $C_1$-$C_{10}$ alkyl groups, $C_6$-$C_{10}$ aryl groups, or $C_7$-$C_{12}$ arylalkyl groups, e.g. $C_1$-$C_8$ alkyl groups. Most especially preferred hydrocarbyl groups are methyl, ethyl, propyl, isopropyl, tert.-butyl, isobutyl, $C_5$-$C_6$ cycloalkyl, cyclohexylmethyl, phenyl or benzyl.

The term halo includes fluoro-, chloro-, bromo- and iodo-groups, especially chloro-groups, when relating to the complex definition.

The term heterocyclic group means a preferably monocyclic non-aromatic ring structure comprising at least one heteroatom, e.g. piperidinyl or piperazinyl.

The term heteroaryl means a preferably monocyclic aromatic ring structure comprising at least one heteroatom. Preferred heteroaryl groups have 1 to 4 heteroatoms selected from O, S and N. Preferred heteroaryl groups include furanyl, thiophenyl, oxazole, thiazole, isothiazole, isooxazole, triazole and pyridyl.

Any group including "one or more heteroatoms belonging to groups 14-16 of the periodic table of elements" preferably means 0, S or N. N groups may present as —NH— or —NR"— where R" is $C_1$-$C_{10}$ alkyl. There may, for example, be 1 to 4 heteroatoms.

The group including one or more heteroatoms belonging to groups 14-16 of the periodic table of elements may also be an alkoxy group, e.g. a $C_1$-$C_{10}$-alkoxy group.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

A preferred subgroup of the metallocenes belong to the group of formula (I), wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
each $R^1$ is independently a $C_1$-$C_{20}$ hydrocarbyl radical optionally containing one or more heteroatoms from groups 14-16 of the periodic table of elements;
each $R^a$ is independently hydrogen or an aliphatic $C_1$-$C_{20}$ hydrocarbyl group optionally containing one or more heteroatoms from groups 14-16 of the periodic table of elements;
each $R^b$ is independently hydrogen or an aliphatic $C_1$-$C_{20}$ hydrocarbyl group optionally containing one or more heteroatoms from groups 14-16 of the periodic table of elements; or
an $R^a$ and $R^b$ group on adjacent carbon atoms can be taken together to form a 5-membered saturated carbon ring which is optionally substituted by a group $R^2$;
each $R^2$ is a $C_1$-$C_{20}$ hydrocarbyl group;
each $R^4$ is independently hydrogen or an aliphatic $C_{1-20}$ hydrocarbyl group optionally containing one or more heteroatoms from groups 14-16 of the periodic table of elements;
each W group is independently an aryl or heteroaryl group having up to 20 carbon atoms optionally substituted by one or more groups $R^3$;
each $R^3$ is a $C_1$-$C_{20}$ hydrocarbyl group, or two $R^3$ groups on adjacent carbon atoms taken together can form a fused 5- or 6-membered non aromatic ring with the W group, said ring being itself optionally substituted with one or more $C_1$-$C_{20}$ hydrocarbyl group(s);
and (ii) a co-catalyst comprising a compound of a metal of group 13 of the periodic table of elements, e.g. boron.

Preferred embodiments of the catalyst system according to formula (I) are: rac-dimethylsilanediyl-bis[2-methyl-4-(3',5'-di-tert-butylphenyl)-7-methoxyindenyl]hafnium dichloride, rac-dimethylsilanediyl-bis[2-iso-butyl-4-phenyl-5-methoxy-6-tert-butylinden-1-yl]zirconium dichloride,
rac-dimethylsilanediyl-bis[2-methyl-4-(3',5'-di-tert-butylphenyl)-7-methoxyindenyl]zirconium dichloride,
rac-β-{bis-[η$^5$-2-methyl-4-(4'-tert-butylphenyl)-1,5,6,7-tetrahydro-s-indacen-1-yl] dimethylsilanediyl}dichlorozirconium),
(rac-anti-dimethylsilanediyl[2,6-methyl-4-(3',5'-dimethylphenyl) inden-1-yl][2-methyl-4-(3',5'-dimethylphenyl)-5-methoxy-6-tert-butyl inden-1-yl] zirconium dichloride), and
(rac-anti-dimethylsilanediyl[2-methyl-4-(3',5'-dimethylphenyl)-1,5,6,7-tetrahydro-s-indacen-1-yl][2-methyl-4-(3',5'-dimethylphenyl)-5-methoxy-6-tert-butyl-inden-1-yl]hafnium dichloride), The catalyst of the invention may preferably be used in supported form.

The catalyst used in the present invention in solid form, preferably in solid particulate form may be supported on an external carrier material, like silica or alumina.

The two multicyclic ligands making up the complex of formula (I) are preferably identical and hence the complex of formula (I) may be symmetrical. The complexes of the invention may be in their meso or racemic forms (or a mixture thereof). Preferably, the racemic (rac) form is used.

To form an active catalytic species it is normally necessary to employ a co-catalyst as is well known in the art. Co-catalysts comprising one or more compounds of Group 13 metals, like organoaluminum compounds or borates used to activate metallocene catalysts are suitable for use in this invention.

The single-site polymerization catalyst system used in the invention comprises (i) a complex as defined herein; and typically (ii) an aluminum alkyl compound (or other appropriate co-catalyst), or the reaction product thereof. Thus the co-catalyst is preferably an alumoxane, like MAO or an alumoxane other than MAO. The preferred aluminoxane is methylaluminoxane (MAO). Other preferred aluminum alkyl compounds are triethylaluminum, tri-isobutylaluminum, tri-isohexylaluminum, tri-n-octylaluminum and tri-isooctylaluminum.

Since the aluminoxanes used according to the invention as co-catalysts are not, owing to their mode of preparation, pure compounds, the molarity of aluminoxane solutions hereinafter is based on their aluminum content. The present solid catalyst system comprises (I) a complex in which the metal ion is coordinated by a ligand as defined herein; and normally (ii) an aluminum alkyl compound (or other appropriate co-catalyst), or the reaction product thereof. Thus the co-catalyst is preferably an alumoxane, like MAO or an alumoxane other than MAO.

Borate co-catalysts can also be employed. It will be appreciated by the skilled person that where boron based co-catalysts are employed, it is normal to preactivate the complex by reaction thereof with an aluminum alkyl compound, such as TIBA. This procedure is well known and any suitable aluminum alkyl, e.g. Al($C_{1-6}$-alkyl)$_3$ can be used.

It is also possible to use a mixture of Al-based and B-based co-catalysts. Aluminoxanes are formed on partial hydrolysis of organoaluminum compounds, for example those of the formula AlR$_3$, AlR$_2$Y and Al$_2$R$_3$Y$_3$, where R can be, for example, $C_1$-$C_{10}$ alkyl, preferably $C_1$-$C_5$ alkyl, or $C_{3-10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers.

Alternatively, however, the catalysts of the invention may be used with other co-catalysts, e.g. boron compounds such as $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4^{2-}$.

Suitable amounts of co-catalyst will be well known to the skilled person. Typically Al to M molar ratios are from 1:1 to 1000:1 mol/mol. Preferably when an aluminum alkyl is used as a co-catalyst, the molar ratio of the aluminum in the activator to the transition metal in the complex is from 1 to 500 mol/mol, preferably from 10 to 400 mol/mol and in particular from 50 to 400 mol/mol.

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 µm, more preferably 20 to 80 µm. The use of these supports is known in the art.

Polymerization Process

The propylene homopolymer composition according to the present invention may be produced by a process comprising the steps of:
(i) polymerizing propylene in the presence of a single-site polymerization catalyst into a propylene homopolymer (A) as defined above,
(ii) melt mixing a suitable amount of the nucleating agent (B) selective for the beta-modification of isotactic polypropylene with said propylene homopolymer (A) in a melt mixing device, and
(iii) solidifying the resulting melt in a strand or underwater pelletization process.

The polymerization of propylene by using the above defined solid catalyst system may be effected in one or more, e.g. one, two or three polymerization reactors, using conventional polymerization techniques, e.g. gas phase, solution phase, slurry or bulk polymerization.

Polymerization processes which are suitable for producing the propylene-ethylene random copolymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene homopolymer is produced in at least two reactors connected in series. Accordingly such a polymerization system comprises at least a first polymerization reactor (R1) and a second polymerization reactor (R2), and optionally a third polymerization reactor (R3). In case a "sequential polymerization process" is applied, the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) is preferably a fluidized bed reactor, a fast fluidized bed reactor or a settled bed reactor or any combination thereof.

However, in general, a single-step polymerization process is preferred. The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

For slurry reactors, the reaction temperature will generally be in the range 60 to 110° C. (e.g. 60 to 90° C.), the reactor pressure will generally be in the range 5 to 80 bar (e.g. 20 to 60 bar), and the residence time will generally be in the range 0.1 to 5 hours (e.g. 0.3 to 2 hours). Propylene is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be propylene optionally as mixture with a non-reactive gas such as nitrogen or propane. In addition to actual polymerization steps and reactors, the process can contain any additional polymerization steps, like prepolymerization step, and any further after reactor handling steps as known in the art.

Generally the quantity of solid catalyst system used will depend upon the nature of the catalyst, the reactor types and conditions and the properties desired for the polymer product. As is well known in the art hydrogen can be used for controlling the molecular weight of the polymer.

The propylene homopolymer composition according to present invention is formed by subjecting the propylene homopolymer as described herein to a moulding step. Preferably, such moulding step is a compression moulding step or an extrusion step.

The propylene polymer composition according to the present invention surprisingly has improved impact properties combined with high stereoregularity and a limited amount of regio-defects. It was found that the propylene polymer composition according to the present invention achieves a particularly high amount of β-phase with extremely low amounts of other modifications such as γ-phase. This polymer microstructure surprisingly increased the impact strength substantially.

Moulded Propylene Homopolymer Product

The moulded propylene homopolymer product of present invention is preferably a (compression) moulded propylene homopolymer. The terms "moulding" or "moulded" according to this invention is broadly understood and thus cover articles obtained by any kind of forming processes via moulding. The terms "moulding" or "moulded" in particular covers for example injection moulded, compression moulded or extruded articles. Combinations of these forming processes like extrusion blow moulding, injection blow moulding, injection stretch blow moulding are covered as well. In the compression moulding process the moulding material is placed in a mould cavity and heated up to a temperature above the main melting temperature (Tm). The mould cavity is closed and a top force pressure of more than the atmospheric pressure is applied. Afterwards the material is cooled down, optionally the pressure is holded during the cooling phase. In the injection moulded process the moulding material is fed into a heated barrel (where it is heated up and moulded) and forced into a mould cavity where it cools down under pressure. In the extrusion process the material is heated up and moulded in the extruder and pushed through a die. Reference with regard to the definitions of extrusion and moulding is made to the "Polypropylene Handbook", Nello Pasquini, $2^{nd}$ Edition, Hanser.

According to the present invention a moulded propylene homopolymer (product) has been molten either with or without pressure. In turn a compression moulded propylene homopolymer (product) has been molten under pressure, i.e. a pressure being higher than the atmospheric pressure.

In particular, the moulded propylene homopolymer product may be an article forming a part of a fluid transportation system, filtration system or fluid storage system. More preferably, the article may be a pipe, a filter plate, a fitting or any other part of a fluid transportation system, filtration system or fluid storage system.

Measurement Methods (a) Melt Flow Rate (MFR)

The melt flow rate is measured as the $MFR_2$ in accordance with ISO 1133 15 (230° C., 2.16 kg load) for polypropylene. The MFR is an indication of the flowability, and hence the processability, of the polymer. The higher the melt flow rate, the lower the viscosity of the polymer.

(b) Number Average Molecular Weight (Mn), Weight Average Molecular Weight (Mw) and Polydispersity (Mw/Mn)

The measurements were conducted by gel permeation chromatography (GPC). The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003.

A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 ml/min. 216.5 µl of a sample solution were injected per analysis. The column set was calibrated using relative calibration with 19 narrow MWD polystyrene (PS) standards in the range of 0.5 kg/mol to 11 500 kg/mol and a set of well characterized broad polypropylene standards.

All samples were prepared by dissolving 5-10 mg of polymer in 10 ml (at 160° C.) of stabilized TCB (same as mobile phase) and keeping for 3 hours with continuous shaking prior sampling in into the GPC instrument.

(c) Quantification of Microstructure by NMR Spectroscopy

Quantitative nuclear-magnetic resonance (NMR) spectroscopy was used to quantify the stereo-regularity (tacticity) and regio-regularity of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21e] mol %=100*($P_{21e}/P_{total}$)

(d) Wide Angle X-Ray Scattering Measurement (WAXS)

The measurement of wide-angle X-ray scattering (WAXS) of the samples was conducted by a Bruker D8 Discover apparatus. The diffractometer was equipped with an X-ray tube with a copper target operating at 30 kV and 20 mA and a GADDS 2-D detector. A point collimation (0.5 mm) was used to direct the beam onto the surface. The measurement was done in reflection geometry, and 2θ angle in the range from 10° to 32.5° were measured. Data were collected for 300 s. Intensity vs. 2-theta curve was acquired with the same measurement parameters on an amorphous polypropylene sample, which was prepared by solvent extraction. An amorphous halo was obtained by smoothing the curve. The amorphous halo has been subtracted from the measured intensity vs. 2-theta curve to result in the crystalline curve.

The crystallinity index Xc can be defined with the area under the crystalline curve and the original spectrum using Challa, Hermans and Weidinger method [Challa G, Hermans P H, Weidinger A, Makromol. Chem. 56, 169 (1962)] as:

$$X_c = \frac{\text{area under crystalline curve}}{\text{area under original spectrum}} \times 100$$

The amount of β-form of the polypropylene within the crystalline phase $K_β$ is calculated using Jones method [Turner-Jones A, Aizlewood J M, Beckett D R, Makromol. Chem. 75, 134 (1974)] according to the following equation:

$$K_β = \frac{I^β(300)}{I^α(110) + I^α(040) + I^α(130) + I^β(300)}$$

where, $I^β(300)$ is the intensity of β(300) peak, $I^α(110)$ is the intensity of α(110) peak, $I^α(040)$ is the intensity of α(040) peak and $I^α(130)$ is the intensity of α(130) peak obtained after subtracting the amorphous halo.

The amount of γ-form of isotactic polypropylene (iPP) within the crystalline phase Kγ is calculated using the method developed by Pae [Pae K D, J. Polym. Sci., Part A, 6, 657 (1968)] as:

$$K_γ = \frac{I^γ(117)}{I^α(130) + I^γ(117)}$$

where, $I^α(130)$ is the intensity of α(130) peak and $I^γ(117)$ is the intensity of γ(117) peak obtained after subtracting a base line joining the base of these peaks.

Quantification of three-phase crystalline system has been carried out following the procedure explained in Obadal M, Cermak R, Stoklasa K, Macromol. Rapid Commun. 26, 1253 (2005). For three-phase crystalline systems the following equations have been used to determine Kα (amount of α-phase), $K_β$ (amount of β-phase) and Kγ (amount of γ-phase):

$$K_β = \frac{I^β(300)}{I^α(110) + I^α(040) + I^α(130) + I^β(300) + I^γ(117)}$$

$$K_{α+γ} = 1 - K_β,$$

$$K_γ = G \times K_{α+γ},$$

and $$K_α = 1 - K_β - K_γ$$

(e) DSC Analysis, Main Melting Temperature ($T_m$), Heat of Melting ($H_m$), and Crystallization Temperature ($T_c$)

DSC analysis was measured with a Mettler TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) is determined from the cooling step, while main melting temperature (Tm) and heat of melting ($H_m$) are determined from the second heating step.

(f) Charpy Notched Impact Strength and Delta NIS

The Charpy notched impact strength (NIS) is measured according to ISO 179 1eA at +23° C. and 0° C., using injection moulded bar test specimens of 80×10×4 mm³ prepared in accordance with EN ISO 1873-2.

The relative effect of β-nucleation on impact strength (DeltaNIS) was calculated on the basis of the following formula:

DeltaNIS=($NIS_{nuc}$−$NIS_{base}$)/$NIS_{base}$ where $NIS_{nuc}$ stands for the value of the β-nucleated polymer while $NIS_{base}$ stands for the value of the non-nucleated base polymer. The measurement of DeltaNIS was done at 23° C.

(g) Flexural Modulus

The flexural modulus was determined in 3-point-bending at 23° C. according to ISO 178 on 80×10×4 mm³ test bars injection moulded in line with EN ISO 1873-2.

(h) Compression Moulding

Samples for WAXS measurements have been prepared according to ISO 173-2, on a frame mould:

Conditions for compression moulding of test specimens:

| Moulding temperature | [° C.] | 210 |
| Average cooling rate | [° C./min] | 15 |
| Demoulding temperature | [° C.] | ≤40 |
| Full Pressure | [MPa] | 5 |
| Full-pressure time | [min] | 5 |
| Preheating pressure | [MPa] | none |
| Preheating time | [min] | 10 |

(i) Xylene Cold Soluble Fraction

The xylene cold solubles (XCS, wt.-%) were determined at 25° C. according to ISO 16152; first edition; 2005-07-01.

The present invention will now be illustrated by way of examples.

EXAMPLES

The catalysts used in the polymerization process for the propylene copolymer of the inventive examples were produced as follows:

Catalysts

Catalyst A

(rac-μ-dimethylsilanediyl-bis-[η⁵-2-methyl-4-(4'-tert-butylphenyl)-1,5,6,7-tetrahydro-s-indacen-1-yl]zirconium-dichloride) was prepared as described in WO 2006/097497 A1. The ¹H-NMR spectrum of it corresponds to that reported in the mentioned patent application. The respective metallocene is identical to MC-CE5 in WO 2018/122134 A1.

The silica-MAO catalysts have been prepared on 30p SUNSPERA DM-L-303 silica produced by AGC Si-Tech Co, previously calcined at 600° C. for 2 hours in an Electric Muffle Furnace under a flow of dry air.

Preparation of silica supported metallocene catalyst is described in WO 2018/122134.

Catalyst A was prepared analogous using metallocene MC-CE5

Catalyst B

(rac-anti-dimethylsilanediyl[2,6-methyl-4-(3',5'-dimethylphenyl)-inden-1-yl][2-methyl-4-(3',5'-dimethylphenyl)-5-methoxy-6-tert-butyl-inden-1-yl] zirconium dichloride) was produced analogously to catalyst A, as also described in WO 2006/097497 A1. The respective metallocene is identical to MC-CE7 in WO 2018/122134 A1.

The silica-MAO catalysts have been prepared on 30µ SUNSPERA DM-L-303 silica produced by AGC Si-Tech Co, previously calcined at 600° C. for 2 hours in an Electric Muffle Furnace under a flow of dry air.

Preparation of silica supported metallocene catalyst is described in WO 2018/122134.

Catalyst B was prepared analogously using metallocene MC-CE7.

Catalyst C rac-anti-dimethylsilanediyl[2-methyl-4-(3',5'-dimethylphenyl)-1,5,6,7-tetrahydro-s-indacen-1-yl][2-methyl-4-(3',5'-dimethylphenyl)-5-methoxy-6-tert.-butylinden-1-yl] hafnium dichloride Catalyst C was prepared according to the following procedure:

(3,5-Dimethylphenyl)boronic Acid

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over $Na_2SO_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for $C_8H_{11}BO_2$: C, 64.06; H, 7.39. Found: C, 64.38; H, 7.72.

$^1$H NMR (DMSO-$d_6$): δ 7.38 (s, 2H), 7.00 (s, 1H), 3.44 (very br.s, 2H), 2.24 (s, 6H).

6-tert-Butyl-4-(3',5'-dimethylphenyl)-5-methoxy-2-methylindan-1-one

A mixture of 49.14 g (157.9 mmol) of 4-bromo-6-tert-butyl-5-methoxy-2-methylindan-1-one, 29.6 g (197.4 mmol, 1.25 eq.) of (3,5-dimethylphenyl)boronic acid, 45.2 g (427 mmol) of Na$_2$CO$_3$, 1.87 g (8.3 mmol, 5 mol. %) of Pd(OAc)$_2$, 4.36 g (16.6 mmol, 10 mol. %) of PPh$_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K$_2$CO$_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 6-tert-butyl-4-(3',5'-dimethylphenyl)-5-methoxy-2-methylindan-1-one as a brownish oil.

Anal. calc. for C$_{23}$H$_{28}$O$_2$: C, 82.10; H, 8.39. Found: C, 82.39; H, 8.52.

$^1$H NMR (CDCl$_3$): δ7.73 (s, 1H), 7.02 (s, 1H), 7.01 (s, 2H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H).

$^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

5-tert-Butyl-7-(3',5'-dimethylphenyl)-6-methoxy-2-methyl-1H-indene

8.2 g (217 mmol) of NaBH$_4$ was added to a solution of 48.43 g (143.9 mmol) of 6-tert-butyl-4-(3',5'-dimethylphenyl)-5-methoxy-2-methylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na$_2$CO$_3$, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 5-tert-butyl-7-(3',5'-dimethylphenyl)-6-methoxy-2-methyl-1H-indene which was further used without additional purification.

Anal. calc. for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 2H), 6.98 (br.s, 1H), 6.42 (m, 1H), 3.25 (s, 3H), 3.11 (s, 2H), 2.36 (s, 6H), 2.06 (s, 3H), 1.43 (s, 9H).

$^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3',5'-dimethylphenyl)-5-methoxy-6-tert-butyl-1H-inden-1-yl] chlorodimethylsilane "BuLi in hexane (2.43 M, 25.2 ml, 61.24 mmol) was added in one portion to a solution of 19.66 g (61.35 mmol) of 2-methyl-5-tert-butyl-6-methoxy-7-(3',5'-dimethylphenyl)-1H-indene in 300 ml of ether cooled to −50° C. The resulting mixture was stirred for 4 h at room temperature, then the resulting yellow suspension was cooled to −60° C., and 40.0 ml (42.8 g, 331.6 mmol, 5.4 eqv.) of dichlorodimethylsilane was added in one portion. The obtained solution was stirred overnight at room temperature and then filtered through a glass frit (G3). The filtrate was evaporated to dryness to give [2-methyl-4-(3',5'-dimethylphenyl)-5-methoxy-6-tert-butyl-1H-inden-1-yl]chlorodimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}$C{$^1$H}NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

1-Methoxy-2-methyl-4-(3',5'-dimethylphenyl)-1,2,3,5,6,7-hexahydro-s-indacene

The precursor 4-bromo-1-methoxy-2-methyl-1,2,3,5,6,7-hexahydro-s-indacene was made according to the procedure described in WO 2015/158790 A2 (pp 26-29).

To a mixture of 2.0 g (2.56 mmol, 1.8 mol. %) of NiCl$_2$(PPh$_3$)IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 µm; eluent: hexanes-dichloromethane=2:1, vol., then 1:2, vol.). This procedure gave 43.02 g (99%) of 1-methoxy-2-methyl-4-(3',5'-dimethylphenyl)-1,2,3,5,6,7-hexahydro-s-indacene as a colorless thick oil as a mixture of two diastereoisomers.

Anal. calc. for C$_{22}$H$_{26}$O: C, 86.23; H, 8.55. Found: C, 86.07; H, 8.82.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

4-(3',5'-Dimethylphenyl)-6-methyl-1,2,3,5-tetrahydro-s-indacene

To the solution of 43.02 g (140.4 mmol) 1-methoxy-2-methyl-4-(3',5'-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 µm; eluent: hexanes, then hexanes-dichloromethane=10:1, vol.). This procedure gave 35.66 g (93%) of 4-(3',5'-dimethylphenyl)-6-methyl-1,2,3,5-tetrahydro-s-indacene as a slightly yellowish oil which spontaneously solidified to form a white mass.

Anal. calc. for $C_{21}H_{22}$: C, 91.92; H, 8.08. Found: C, 91.78; H, 8.25.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

[2-methyl-4-(3',5'-dimethylphenyl)-5-methoxy-6-tert-butyl-inden-1-yl][2-methyl-4-(3',5'-dimethylphenyl)-1,5,6,7-tetrahydro-s-indacen-1-yl]dimethylsilane $^n$BuLi in hexane (2.43 M, 25.2 ml, 61.24 mmol) was added in one portion to a solution of 16.83 g (61.33 mmol) of 4-(3',5'-dimethylphenyl)-6-methyl-1,2,3,5-tetrahydro-s-indacene in a mixture of 300 ml of ether and 40 ml of THF, cooled to −50° C. This mixture was stirred overnight at room temperature, then the resulting reddish solution was cooled to −50° C., and 300 mg of CuCN was added. The obtained mixture was stirred for 0.5 h at −25° C., then a solution of [2-methyl-4-(3',5'-dimethylphenyl)-5-methoxy-6-tert-butyl-1H-inden-1-yl]chlorodimethylsilane (prepared above, ca. 61.24 mmol) in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the residue was dried in vacuum at elevated temperature. This procedure gave 39.22 g (98%) of [2-methyl-4-(3',5'-dimethylphenyl)-5-methoxy-6-tert-butyl-1H-inden-1-yl][2-methyl-4-(3',5'-dimethylphenyl)-1,5,6,7-tetrahydro-s-indacen-1-yl]dimethylsilane (a ca. 3:2 mixture of stereoisomers) as a reddish glass.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}$C{$^1$H} NMR (CDCl$_3$): δ155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, _128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3',5'-dimethylphenyl)-5-methoxy-6-tert-butyl-inden-1-yl][2-methyl-4-(3',5'-dimethylphenyl)-1,5,6,7-tetrahydro-s-indacen-1-yl]hafnium dichloride "BuLi in hexane (2.43 M, 49.6 ml, 120.5 mmol) was added in one portion to a solution of 39.22 g (60.25 mmol) of [2-methyl-4-(3',5'-dimethylphenyl)-5-methoxy-6-tert-butyl-1H-inden-1-yl][2-methyl-4-(3',5'-dimethylphenyl)-1,5,6,7-tetrahydro-s-indacen-1-yl]dimethylsilane (prepared above) in 400 ml of ether, cooled to −50° C. This mixture was stirred overnight at room temperature. The resulting red solution was then cooled to −78° C., and 19.3 g (60.26 mmol) of HfCl$_4$ was added. The reaction mixture was stirred for 24 h at room temperature to give an orange suspension. The precipitate was filtered off (G4), then washed with 30 ml of cold ether. On the evidence of NMR spectroscopy, this precipitate was pure syn-hafnocene dichloride (with LiCl), while the filtrate included a ca. 4/1 mixture of anti- and syn-hafnocene dichlorides (in favor to anti-) contaminated with some other impurities. The precipitate was dissolved in 150 ml of hot toluene, and the formed suspension was filtered to remove LiCl through glass frit (G4). The filtrate was evaporated to ca. 45 ml. Orange sold material precipitated overnight at room temperature was filtered off (G3) and then dried in vacuum. This procedure gave 8.1 g (15%) of pure syn-complex. The mother liquor was evaporated almost to dryness, and the residue was triturated with 20 ml of n-hexane to give 2.6 g (4.8%) of syn-hafnocene dichloride as an orange powder. The ether mother liquor was evaporated to ca. 60 ml, the precipitated yellow powder was filtered off (G4), washed with 20 ml of cold (0° C.) ether, and then dried under vacuum. This procedure gave 10.2 g (19%) of pure anti-hafnocene dichloride. Thus, the total yield of anti- and syn-hafnocene dichlorides isolated in this synthesis was 20.9 g (39%).

Anti-dimethylsilanediyl[2-methyl-4-(3',5'-dimethylphenyl)-5-methoxy-6-tert-butyl-inden-1-yl][2-methyl-4-(3',5'-dimethylphenyl)-1,5,6,7-tetrahydro-s-indacen-1-yl]hafnium dichloride Anal. calc. for $C_{46}H_{52}C_{12}OSiHf$: C, 61.50; H, 5.83. Found: C, 61.38; H, 6.15.

$^1$H NMR (CDCl$_3$): δ 7.51 (s, 1H), 7.43 (s, 1H), 7.34-7.02 (br.m, 4H), 6.94 (s, 2H), 6.61 (s, 1H), 6.46 (s, 1H), 3.42 (s, 3H), 3.11-2.79 (m, 4H), 2.33 (s, 6H), 2.32 (s, 6H), 2.27 (s, 6H), 2.07-1.92 (m, 2H), 1.38 (s, 9H), 1.27 (s, 3H), 1.26 (s, 3H). $^{13}$C{$^1$H} NMR (CDCl$_3$): δ 159.55, 144.17, 143.58, 142.84, 138.38, 137.82, 137.57, 136.94, 133.09, 132.67, 132.40, 132.11, 131.23, 128.84, 128.76, 127.40, 126.88, 126.53, 124.97, 121.28, 120.84, 119.76, 119.71, 117.90, 82.92, 82.40, 62.62, 35.68, 33.11, 32.07, 30.43, 26.56, 21.46, 21.38, 18.26, 18.12, 2.63, 2.53.

Syn-dimethylsilanediyl[2-methyl-4-(3',5'-dimethylphenyl)-5-methoxy-6-tert-butyl-inden-1-yl][2-methyl-4-(3',5'-dimethylphenyl)-1,5,6,7-tetrahydro-s-indacen-1-yl]hafnium dichloride Anal. calc. for $C_{46}H_{52}C_{12}OSiHf$: C, 61.50; H, 5.83. Found: C, 61.59; H, 6.06.

$^1$H NMR (CDCl$_3$): δ 7.53 (s, 1H), 7.41 (s, 1H), 7.29-7.06 (m, 4H), 6.94 (s, 2H), 6.50 (s, 1H), 6.35 (s, 1H), 3.26 (s, 3H), 2.95-2.77 (m, 4H), 2.49 (s, 3H), 2.46 (s, 3H), 2.33 (2s, sum 12H), 1.99-1.86 (m, 1H), 1.86-1.73 (m, 1H), 1.40 (s, 3H), 1.37 (s, 9H), 1.18 (s, 3H). $^{13}$C{$^1$H} NMR (CDCl$_3$): δ158.61, 143.03, 142.46, 142.16, 138.42, 137.73, 137.52, 136.98, 135.33, 134.60, 133.69, 132.53, 131.19, 128.79, 128.71, 127.34, 126.85, 126.00, 125.76, 121.95, 121.45, 119.12, 118.91, 118.55, 84.66, 84.26, 62.31, 35.48, 33.25, 31.94, 30.40, 26.60, 21.44, 18.31, 2.93, 2.61.

The silica-MAO catalysts have been prepared on 30μ SUNSPERA DM-L-303 silica produced by AGC Si-Tech Co, previously calcined at 600° C. for 2 hours in an Electric Muffle Furnace under a flow of dry air.

Preparation of silica supported metallocene catalyst is described in WO 2018/122134.

Catalyst C was prepared analogous using metallocene rac-anti-dimethylsilanediyl[2-methyl-4-(3',5'-dimethylphenyl)-5-methoxy-6-tert-butyl-inden-1-yl][2-methyl-4-(3',5'-dimethylphenyl)-1,5,6,7-tetrahydro-s-indacen-1-yl]hafnium dichloride as prepared above.

Propylene homopolymers PP-1 to PP-4 were produced in the presence of the above catalysts in a bench-scale process. First, the catalysts as defined above (Catalyst A, B and C) were pre-polymerized according to the following procedure. Off-line pre-polymerization was done in a 125 ml pressure reactor equipped with gas-feeding lines and an overhead stirrer. Dry and degassed perfluoro-1,3-dimethylcyclohexane (PFC) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for a polymerization time sufficient to provide the desired degree of polymerization (DP) of about 3.8 g polymer per g catalyst. The reactor was then taken back inside the glove box before opening and the content was poured into a glass vessel. PFC was evaporated until a constant weight of the pre-polymerized catalyst was obtained. The degree of polymerization (DP) was determined gravimetrically and/or by analysis of the ash. The respective homopolymers PP-1, PP-2, PP-3 and PP-4 were then polymerized in a 20 l bench scale reactor at 75° C. in bulk slurry phase, using hydrogen in a suitable concentration to achieve the desired melt flow rate MFR$_2$ (230° C.). The polymerization was stopped after 60 minutes by venting the reactor and flushing with nitrogen before the polymer was collected.

All polymer powders were melt-stabilized with 0.05 wt % of Ca-stearate (CAS Number 1592-23-0) and 0.15 wt % of Irganox B215 (distributed by BASF AG, Germany), a 1:2-mixture of pentaerythrityl-tetrakis(3-(3',5'-di-tert. butyl-4-hydroxyphenyl)-propionate (CAS number 6683-19-8) and tris-(2,4-di-t-butylphenyl) phosphite (CAS number 31570-04-4).

As the β-nucleating agent the following products were used:

A mixture of 5,12-dihydro-quino[2,3-b]acridine-7,14-dione (CAS number 1047-16-1), quino[2,3-b]acridine-6,7,13,14 (5H,12H)-tetrone (CAS number 1503-48-6) and 5,6,12,13-tetrahydroquino[2,3-b]acridine-7,14-dione (CAS number 5862-38-4), which is commercially available as Cinquasia Gold YT-923-D (distributed by BASF AG, Germany) diluted in β-homopolymer powder (HC001A-B1) in a concentration of 0.25 wt % was used β-nucleating agent "N17000-CM1".

Quinacridonequinone (CAS number 1503-48-6; distributed by BASF AG, Germany) was used as β-nucleating agent "CGNA-7588"

A heteronuclear dimetal complex of lanthanum and calcium (distributed by Guangdong Winner Functional Materials Co., China), was used as β-nucleating agent "WBG".

PP-1 is an experimental propylene homopolymer having a melt flow rate $MFR_2$ (230° C.) of 1.05 g/10 min and a Tm of 156° C., prepared in the presence of single-site catalyst A in one-stage bench-scale polymerization, having a pentad isotacticity (mmmm) of 99.4% and a relative amount of <2,1> erythro regio-defects of 0.7 mol %.

PP-2 is an experimental propylene homopolymer having a melt flow rate $MFR_2$ (230° C.) of 0.34 g/10 min and a Tm of 152° C., prepared in the presence of single-site catalyst B in one-stage bench-scale polymerization, having a pentad isotacticity (mmmm) of 99.5% and a relative amount of <2,1> erythro regio-defects of 1.0 mol %.

PP-3 is an experimental propylene homopolymer having a melt flow rate $MFR_2$ (230° C.) of 0.60 g/10 min and a Tm of 152° C., prepared in the presence of single-site catalyst B in one-stage bench-scale polymerization, having a pentad isotacticity (mmmm) of 99.5% and a relative amount of <2,1> erythro regio-defects of 1.0 mol %.

PP-4 is an experimental propylene homopolymer having a melt flow rate $MFR_2$ (230° C.) of 0.24 g/10 min and a Tm of 160° C., prepared in the presence of single-site catalyst C in one-stage bench-scale polymerization, having a pentad isotacticity (mmmm) of 99.7% and a relative amount of <2,1> erythro regio-defects of 0.9 mol % PP-5 is a commercial unimodal propylene homopolymer B-Powder-10 of Borealis AG having a melt flow rate $MFR_2$ (230° C.) of about 0.3 g/10 min, a $T_m$ of 163° C., a Mw of 1007 kg/mol and Mw/Mn of 4.9, prepared in the presence of a conventional $4^{th}$ generation Ziegler-Natta catalyst (Catalyst D), having a pentad isotacticity (mmmm) of 95.2% and being free of <2,1> erythro regio-defects PP-6 is a commercial unimodal propylene homopolymer HC001A-B1 of Borealis AG having a melt flow rate $MFR_2$ (230° C.) of about 2.5 g/10 min, a $T_m$ of 163° C., a Mw of 565 kg/mol and Mw/Mn of 6.2, prepared in the presence of a $3^{rd}$ generation Ziegler-Natta catalyst (Catalyst E), having a pentad isotacticity (mmmm) of 93.1% and being free of <2,1> erythro regio-defects.

The properties of the obtained compositions are shown in Table 2 below.

TABLE 1

|  | unit | IE1 SSC | IE2 SSC | IE3 SSC | CE1 SSC | CE2 SSC | CE3 SSC | CE4 SSC | CE5 ZN | CE6 ZN | CE7 ZN | CE8 ZN |
|---|---|---|---|---|---|---|---|---|---|---|---|---|
| PP-1 | wt % | 99.2 |  |  | 99.8 |  |  |  |  |  |  |  |
| PP-2 | wt % |  | 99.2 |  |  | 99.8 |  |  |  |  |  |  |
| PP-3 | wt % |  |  |  |  |  | 99.59 |  |  |  |  |  |
| PP-4 | wt % |  |  | 99.79 |  |  |  | 99.8 |  |  |  |  |
| PP-5 | wt % |  |  |  |  |  |  |  | 99.8 | 99.59 |  |  |
| PP-6 | wt % |  |  |  |  |  |  |  |  |  | 99.8 | 99.2 |
| AO501 | wt % | 0.15 | 0.15 | 0.15 | 0.15 | 0.15 | 0.15 | 0.15 | 0.15 | 0.15 | 0.15 | 0.15 |
| AS110 | wt % | 0.05 | 0.05 | 0.05 | 0.05 | 0.05 | 0.05 | 0.05 | 0.05 | 0.05 | 0.05 | 0.05 |
| N17000-CM1 | wt % | 0.6 | 0.6 |  |  |  |  |  |  |  |  | 0.6 |
| CGNA-7588 | wt % |  |  | 0.01 |  |  |  |  |  |  |  |  |
| WBG | wt % |  |  |  |  | 0.21 |  |  | 0.21 |  |  |  |

The designations "SSC" and "ZN" signify that a single site catalyst or a Ziegler-Natta catalyst was used respectively
AO501 is the antioxidant Irganox B215 described above
AS110 is the calcium stearate described above
N17000-CM1, CGNA-7588 and WBG are the β-nucleating agents as described above (of these, WBG was found not to give the desired degree of β-phase content and respective mechanical performance in case of SSC-PP)

TABLE 2

|  |  | IE1 | IE2 | IE3 | CE1 | CE2 | CE3 | CE4 | CE5 | CE6 | CE7 | CE8 |
|---|---|---|---|---|---|---|---|---|---|---|---|---|
| Mw | kg/mol | 348 | 478 | 492 | 348 | 478 | 475 | 492 | 1007 | 1007 | 565 | 565 |
| Mw/Mn | — | 3.0 | 3.3 | 3.0 | 3.0 | 3.3 | 3.7 | 3.0 | 4.9 | 4.9 | 6.2 | 6.2 |
| $MFR_2$ (230° C.) | g/10 min | 1.23 | 0.37 | 0.26 | 1.05 | 0.34 | 0.67 | 0.24 | 0.3 | 0.25 | 2.8 | 2.05 |
| XCS | wt.-% | 0.4 | 0.3 | 0.2 | 0.4 | 0.3 | 0.3 | 0.2 | 2.4 | 2.4 | 2.5 | 2.5 |
| Tc | ° C. | 120 | 118 | 121 | 115 | 115 | 116 | 116 | 120 | 124 | 116 | 124 |
| Tm1 | ° C. | 158 | 154 | 162 | 156 | 152 | 153 | 160 | 165 | 169 | 163 | 168 |
| Tm2 | ° C. | 145 | 142 | 148 |  |  | 141 |  |  | 153 |  | 152 |
| Hm1 | J/g | 13.6 | 14.2 | 17 | 99 | 96 | 30.8 | 97 | 98 | 19.1 |  | 18 |
| Hm2 | J/g | 84 | 78 | 83 |  |  | 64.5 |  |  | 77.7 |  | 84 |
| Hm2/(Hm1 + Hm2) | % | 86.1 | 84.6 | 83.0 | 0 | 0 | 67.7 | 0.0 | 0.0 | 80.3 | 0.0 | 82.4 |
| k(β) from WAXS | % | 90.0 | 90.0 | 91.0 | 0.0 | 1.0 | 11.0 | 91.0 | 2.5 | 89.0 | 0.0 | 100.0 |

TABLE 2-continued

|  |  | IE1 | IE2 | IE3 | CE1 | CE2 | CE3 | CE4 | CE5 | CE6 | CE7 | CE8 |
|---|---|---|---|---|---|---|---|---|---|---|---|---|
| k(γ) from WAXS | % | 0.0 | 0.0 | 2.0 | 20.0 | 22.0 | 25.0 | 2.0 | 0.0 | 3.0 | 0.0 | 0.0 |
| Flex. Modulus | MPa | 1505 | 1482 | 1609 | 1550 | 1520 | 1433 | 1751 | 1540 | 1490 | 1640 | 1570 |
| NIS Charpy 23° C. | kJ/m$^2$ | 44.4 | 53.6 | 61.2 | 6.66 | 9.53 | 5.12 | 6.08 | 7.93 | 27.0 | 3.6 | 16.7 |
| NIS Charpy 0° C. | kJ/m$^2$ | 2.39 | 3.96 | 3.60 | 2.23 | 2.66 | 2.23 | 2.04 | 2.25 | 4.25 | 1.5 | 2.25 |
| DeltaNIS23 | — | 5.7 | 4.6 | 9.1 | — | — | 0.1 | — | 2.4 | — | 3.7 |

Hm2/(Hm1 + Hm2) signifies the amount of β-phase (k(β)) determined by DSC, as described above.

Figure 1:
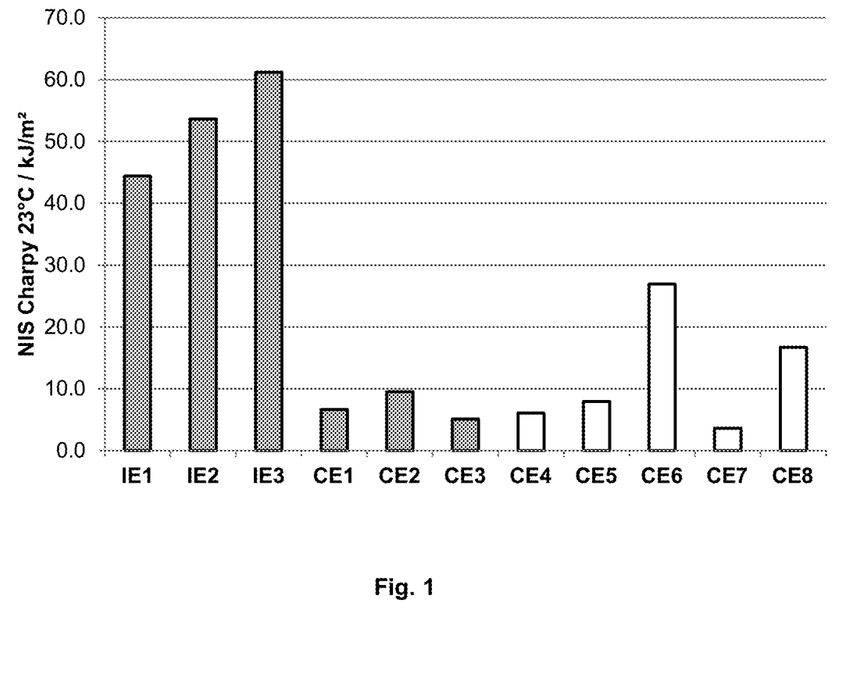
FIG. 1 shows a diagram comparing notched Charpy impact strength values (23° C.) (NIS) for the compositions of the inventive and the comparative examples.
Figure 2:
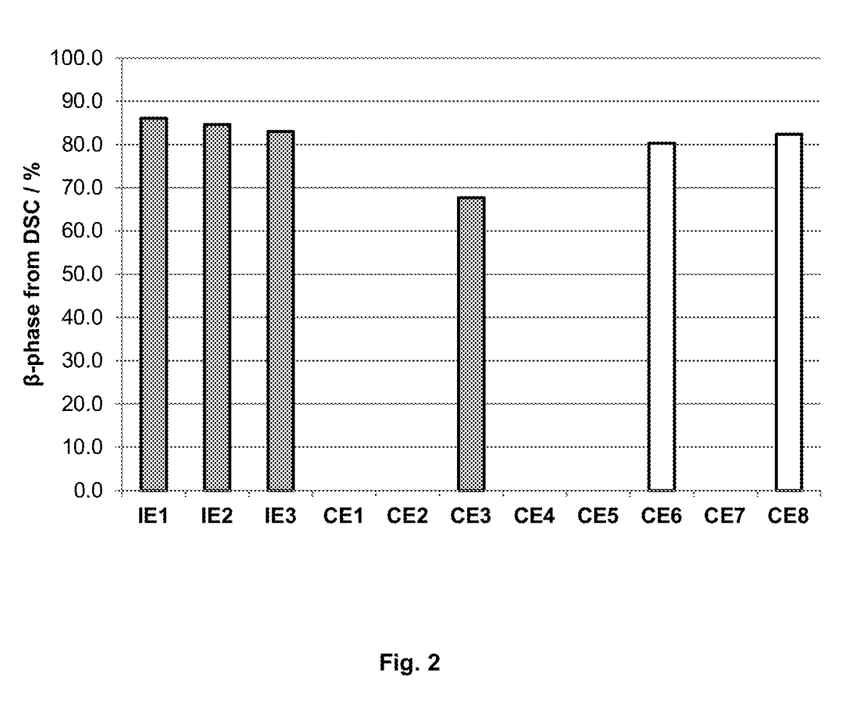
FIG. 2 shows a diagram comparing the β-phase content of the compositions of the inventive and the comparative examples.

The above results show that the propylene polymer compositions of the present invention combine excellent mechanical properties such as high impact strength, exceptional improvement of impact strength compared to the impact strength of the non-nucleated base polymer, expressed as DeltaNIS (23° C.) with still sufficiently high stiffness. The improvement of impact strength (23° C.) is also shown in FIG. 1. A comparison of β-phase content in the compositions is shown in FIG. 2.

This surprising combination of advantageous properties could not be achieved when polymerizing the propylene homopolymers by a conventional Ziegler-Natta catalyst with or without a β-nucleating agent (CE5-CE8). Even when using a single-site (metallocene) catalyst, but in the absence of an efficient β-nucleating agent, the advantages of the invention could not be achieved (CE1 to CE4). CE4 additionally shows that high β-phase content does not secure high impact strength.

The invention claimed is:

1. A propylene homopolymer composition, comprising
   (a) not less than 90 wt. %, based on the weight of the total propylene homopolymer composition, of a propylene homopolymer (A) having
      (i) a pentad isotacticity (mmmm) of equal or more than 98.0 mol.-%, determined by quantitative 13C NMR spectroscopy, as described herein,
      (ii) a relative amount of <2,1> erythro regio-defects of not more than 2.0 mol.-%, determined by quantitative 13C NMR spectroscopy, as described herein, and
   (b) a nucleating agent (B) selective for the beta-modification of isotactic polypropylene in an amount of from 0.001 to 1.0 wt. %, based on the weight of the total propylene homopolymer composition,
   wherein said propylene homopolymer composition has a melt flow rate MFR$_2$ (230° C., 2.16 kg) according to ISO 1133 of 0.1 to 10 g/10 min., a beta-phase content of not less than 80%, measured by wide angle x-ray scattering (WAXS).

2. The propylene homopolymer composition according to claim 1, which has a relative Charpy notched impact strength improvement ΔNIS (23° C.) of not less than 4.0, wherein ΔNIS (23° C.) is defined by:

$$\Delta NIS=(NIS_{nuc}-NIS_{PP})/NIS_{PP}$$

where NIS$_{nuc}$ is the Charpy notched impact strength at 23° C. of the β-nucleated propylene homopolymer composition and NIS$_{PP}$ is the Charpy notched impact strength at 23° C. of the non-nucleated propylene homopolymer (a), the Charpy notched impact strength at 23° C. being measured according to ISO 179 1eA.

3. The propylene homopolymer composition according to claim 1, which has an absolute Charpy notched impact strength at 23° C., measured according to ISO 179 1eA, of not less than 30 KJ/m$^2$.

4. The propylene homopolymer composition according to claim 1, which has a flexural modulus determined according to ISO 178 in the range of 1200 to 2000 MPa.

5. The propylene homopolymer composition according to claim 1, which has a main melting temperature (Tm) of at least 140° C. and/or a crystallization temperature (T$_c$) of at least 114° C., T$_m$ and T$_c$ being measured by differential scanning calorimetry (DSC).

6. The propylene homopolymer composition according to claim 1, which has a relative content of the gamma-modification of less than 5.0%, determined by wide-angle X-ray scattering (WAXS).

7. The propylene homopolymer composition according to claim 1, which has a beta-phase content of not less than 85%, measured by wide angle x-ray scattering (WAXS).

8. The propylene homopolymer composition according to claim 1, wherein the propylene homopolymer (A) has a weight average molecular weight M$_w$ of more than 300 kg/mol and a ratio between weight and number average molecular weight, M$_w$/M$_n$, of not more than 4.0, both M$_w$ and M$_n$ being determined by size exclusion chromatography (SEC).

9. The propylene homopolymer composition according to claim 1, wherein the propylene homopolymer (A) has a content of xylene cold solubles (XCS) fraction of less than 1.5 wt. %.

10. The propylene homopolymer composition according to claim 1, wherein the nucleating agent (B) selective for the beta-modification of isotactic polypropylene is selected from quinacridone type compounds and dicarboxylic acid salts of metals from group IIa of the periodic table.

11. A process for the preparation of a propylene homopolymer composition according to claim 1, comprising the steps of:
   (i) polymerizing propylene in the presence of a single-site polymerization catalyst into a propylene homopolymer (A) as defined in claim 1,
   (ii) melt mixing a suitable amount of the nucleating agent (B) selective for the beta-modification of isotactic polypropylene with said propylene homopolymer (A) in a melt mixing device, and
   (iii) solidifying the resulting melt in a strand or underwater pelletization process.

12. The process according to claim 11, wherein the propylene homopolymer composition is produced in the presence of a supported metallocene catalyst.

13. The process according to claim 11, wherein the propylene homopolymer composition is produced in the presence of a catalyst system comprising (i) a complex of formula (I)

(I)

wherein

M is zirconium or hafnium;

each X is a sigma ligand;

L is a divalent bridge selected from —R'$_2$C—, —R'$_2$C—CR'2-, —R'$_2$Si—, —R'$_2$Si—SiR'$_2$—, and R'$_2$Ge—, wherein each R' is independently a hydrogen atom, $C_1$-$C_{20}$-hydrocarbyl, tri ($C_1$-$C_{20}$-alkyl) silyl, $C_6$-$C_{20}$-aryl, $C_7$-$C_{20}$-arylalkyl or $C_7$-$C_{20}$-alkylaryl;

each R1 is independently a $C_1$-$C_{20}$ hydrocarbyl radical optionally containing one or more heteroatoms from groups 14-16 of the periodic table of elements, or is a $C_4$-$C_{20}$ hydrocarbyl radical branched at the B-atom to the cyclopentadienyl ring, optionally containing one or more heteroatoms belonging to groups 14-16 of the periodic table of elements, or is a $C_3$-$C_{20}$ hydrocarbyl radical branched at the B-atom to the cyclopentadienyl ring where the β-atom is an Si-atom;

each $R^a$ is independently hydrogen or an aliphatic $C_1$-$C_{20}$ hydrocarbyl group optionally containing one or more heteroatoms from groups 14-16 of the periodic table of elements;

each $R^b$ is independently hydrogen or an aliphatic $C_1$-$C_{20}$ hydrocarbyl group optionally containing one or more heteroatoms from groups 14-16 of the periodic table of elements; or an $R^a$ and $R^b$ group on adjacent carbon atoms can be taken together to form a 5-membered saturated carbon ring which is optionally substituted by n groups $R^2$, n being from 0 to 3;

each $R^2$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

each $R^4$ is independently an aliphatic $C_{1-20}$ hydrocarbyl group optionally containing one or more heteroatoms from groups 14-16 of the periodic table of elements or is a hydrogen atom;

each W group is independently an aryl or heteroaryl group having up to 20 carbon atoms optionally substituted by one or more groups $R^3$ each $R^3$ is the same or different and is a $C_1$-$C_{20}$ hydrocarbyl group optionally containing one or more heteroatoms belonging to groups 14-16 of the periodic table of elements;

or two $R^3$ groups on adjacent carbon atoms taken together can form a fused 5- or 6-membered non aromatic ring with the W group, said ring being itself optionally substituted with one or more $C_1$-$C_{20}$ hydrocarbyl group(s), or two adjacent $R^5$ groups taken together can form a further mono-or multicyclic ring condensed to W optionally substituted by one or two groups $R^3$, and (ii) optionally a co-catalyst comprising a compound of a metal of group 13 of the periodic table of elements.

14. A moulded propylene homopolymer product obtained by compression moulding or extrusion of the propylene homopolymer composition according to claim 1.

15. The moulded propylene homopolymer product according to claim 14 selected from the group consisting of a pipe, a filter plate, a fitting or any other part of a fluid transportation system, filtration system and fluid storage system.

* * * * *